US007454783B2

(12) United States Patent
Dupouy et al.

(10) Patent No.: US 7,454,783 B2
(45) Date of Patent: Nov. 18, 2008

(54) SYSTEM, METHOD, AND APPARATUS FOR AUTOMATIC LOGIN

(75) Inventors: David J. Dupouy, Mountain View, CA (US); Patrick J. Detiege, Mountain View, CA (US)

(73) Assignee: MetaPass, Inc., Sunnyvale, CA (US)

( * ) Notice: Subject to any disclaimer, the term of this patent is extended or adjusted under 35 U.S.C. 154(b) by 635 days.

(21) Appl. No.: 10/637,745

(22) Filed: Aug. 8, 2003

(65) Prior Publication Data
US 2005/0033968 A1 Feb. 10, 2005

(51) Int. Cl.
*G06F 9/32* (2006.01)
*G06F 9/455* (2006.01)

(52) U.S. Cl. .............................. 726/7; 703/22; 703/23; 726/8; 726/9

(58) Field of Classification Search ..................... 726/7, 726/8–9; 715/507–508; 703/22, 23
See application file for complete search history.

(56) References Cited

U.S. PATENT DOCUMENTS

| | | | |
|---|---|---|---|
| 5,995,965 | A | 11/1999 | Experton |
| 6,189,105 | B1 | 2/2001 | Lopes |
| 6,339,828 | B1 | 1/2002 | Grawrock et al. |
| 6,385,729 | B1 | 5/2002 | DiGiorgio et al. |
| 6,389,542 | B1 | 5/2002 | Flyntz |
| 6,434,700 | B1 | 8/2002 | Alonso et al. |
| 6,484,174 | B1 | 11/2002 | Wall et al. |
| 6,505,238 | B1 | 1/2003 | Tran |
| 6,532,518 | B2 | 3/2003 | Mac.Smith et al. |
| 6,539,093 | B1 | 3/2003 | Asad et al. |
| 6,581,122 | B1 * | 6/2003 | Sarat .......................... 710/301 |
| 6,587,949 | B1 | 7/2003 | Steinberg |
| 6,589,290 | B1 * | 7/2003 | Maxwell et al. ............. 715/507 |
| 6,662,340 | B2 * | 12/2003 | Rawat et al. ................. 715/507 |
| 6,763,399 | B2 * | 7/2004 | Margalit et al. ............... 710/13 |

(Continued)

OTHER PUBLICATIONS

"The Portable Netissimo Solution," product information from www.netissimo.com; archived in archive.org on Dec. 6, 2002.; http://web.archive.org/web/*/http://www.netissimo.com/netissimo.html.*

(Continued)

*Primary Examiner*—Gilberto Barron, Jr.
*Assistant Examiner*—Jung Kim
(74) *Attorney, Agent, or Firm*—Townsend and Townsend and Crew, LLP

(57) ABSTRACT

A key which is a peripheral device which can directly connect to a host and stores multiple passwords and associated access data. The peripheral device includes an interface to a port of the host for establishing a connection. The peripheral device includes a processor and memory for storing the passwords and a program for both communicating with the host through the port, and for accessing the passwords and associated access data. Unlike the prior art, the present invention does not require the user to have a smart card reader or other token reader in order to access the passwords. In one aspect of the invention, the peripheral device incorporates a form of artificial intelligence to observe and later emulate a user's initial logon to a site. The software not only will recognize the site by storing characteristics of it, but will be able to automatically adapt to variations, if the login page is subsequently modified. In a preferred embodiment, the invention provides for automatically entering passwords in login forms.

23 Claims, 6 Drawing Sheets

U.S. PATENT DOCUMENTS 7,200,804 B1 * 4/2007 Khavari et al. .............. 715/513

OTHER PUBLICATIONS

"128 Megs in your pocket," Express Computer May 13, 2002, on-line journal available at www.expresscomputeronline.com (2002).

"Handango Vault for Palm," advertisement and product information from on-line catalog www.Expansys.com for encrypted database (2003).

"Humetrix.com Receive U.S. Patent for Fundemental Internet Connectivity Process," Press release Nov. 11, 1999, Humetrix.com, Inc. 1155 Camino Delmar, Del Mar, CA 92104 (1999).

"The Portable Netisssimo Solution," product information from www.netissimo.com for automated internet access product (1999-2003).

"Viking 64MB USB Flash Drive," advertisement and product information from on-line catalog www.TigerDirect.com for portable memory storage device (2003).

* cited by examiner

SYSTEM, METHOD, AND APPARATUS FOR AUTOMATIC LOGIN

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to systems for storing and typing/entering multiple passwords, and in particular, to a system for storing passwords on a device external to a computer.

Many different computer applications require a password from the user. In order for the password to be effective, it is preferable to use a different password for each application in the event that one of the passwords is compromised. This can require a user to remember a significant number of passwords, or to write them down, which is often done in a non-secure location.

One solution for this problem is shown in U.S. Pat. No. 6,182,229. A database of encrypted passwords is maintained on the computer, and the user only needs to remember a single master password. The user then only needs to enter the master password to access different websites at different addresses, as indicated by the Universal Resource Locator (URL). An example of a master code for passwords is shown in U.S. Pat. No. 6,253,328. An example of multiple password management is shown in U.S. Pat. No. 6,243,816.

In other systems, access to the computer itself may require a password, and alternately may require a password or other data stored on a smart card or token. Examples of such systems are shown in U.S. Pat. No. 6,434,700 and U.S. Pat. No. 6,389,542. An example of a system requiring a smart card in order to access the site of an Internet Service Provider (ISP) is shown in U.S. Pat. No. 6,385,729.

In addition to smart cards, other types of tokens that can be used with a computer include small storage devices, such as flash memory, secure digital cards (SD cards), etc. Secure data storage on removable media is shown for memory cards in a number of applications, such as in U.S. Pat. No. 6,587,949 for securing digital camera data. With the adoption of the standard for the universal serial bus (USB), data storage devices which plug into a USB port have been developed using flash memory, such as USB flash drives. The data can then be carried from one computer to another on the flash drive, which acts in a similar manner to a standard hard disk or floppy disk.

Humetrix Pat. No. 5,995,965 shows a system for accessing medical records over the Internet. A smart card is used to access the Internet through a smart card reader and computer. The smart card can store the user's ID and access data. The website (not the patent) of Humetrix further describes a product with a smart card that performs additional functions, such as automatic capture of selected URLs, user names and passwords; automated dial-up and connection to the Internet, regardless of ISP/connection; direct, secure login to selected websites and/or online accounts; and a form fill function, for completion of online forms. It also describes security through PIN protection or a biometric authentication application, such as a fingerprint reader. The product is indicated as being usable on a smart card, memory stick, or secure digital (SD) card. A smart card reader is required to use the product.

BRIEF SUMMARY OF THE INVENTION

The present invention provides a key which is a peripheral device which can directly connect to a host and stores multiple passwords and associated access data. The peripheral device includes an interface to a port of the host for establishing a connection. The peripheral device includes a processor and memory for storing the passwords and a program for both communicating with the host through the port, and for accessing the passwords and associated access data. In a preferred embodiment, the invention provides for automatically entering passwords in login forms.

Unlike the prior art, the present invention does not require the user to have a smart card reader or other token reader in order to access the passwords. In the preferred embodiment, the invention is embodied in a USB drive device that connects directly to the USB port of a computer. This allows self-activation as a peripheral device, and allows self-initialization much like putting a CD into the CD drive of a computer to bring up that application.

In one aspect of the invention, the peripheral device incorporates a form of artificial intelligence to observe and later emulate a user's logon to a web site, password-protected application, or terminal emulation software. The software not only will recognize the site by storing characteristics of it, but will be able to automatically adapt to variations, if the login page is subsequently modified, by searching any revised page for the same type of login information. For example, if the password box is moved to a different location, the new login page may be searched for a data entry block near to the word "password" to determine the new location for entering the data. The software then emulates the mouse click on the box and entering of data to initiate the login.

The artificial intelligence uses a visual approach—it records and later recognizes the objects on the logon screens. Upon a subsequent accessing, similar to playing back a movie, the timing between frames or screens may be different due to different connection speeds, etc. The software waits until the appropriate next screen is recognized before attempting to enter the logon information for that screen.

For a further understanding of the nature and advantages of the invention, reference should be made to the following description taken in conjunction with the accompanying drawings.

DETAILED DESCRIPTION OF THE INVENTION

Figure 1:
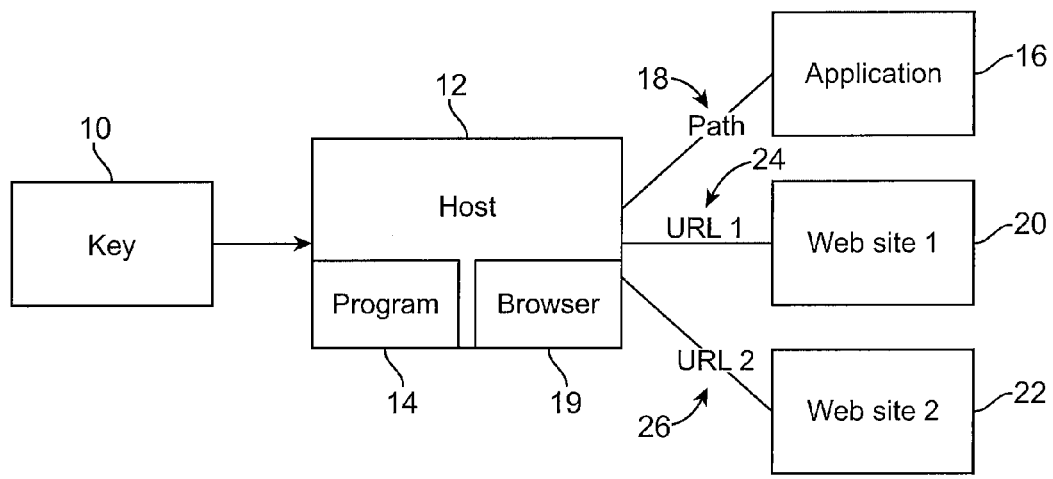
FIG. 1 is a diagram of a system with a key according to the present invention.

FIG. 1 shows a system incorporating the key 10 according to the present invention. Key 10 connects to a host 12 and uploads a program 14 to the host. Program 14 can automatically log in to desired applications, such as an application 16 on the host itself following a path 18. Alternately, it can log into a number of websites through a browser 19, such as websites 20 and 22 using URLs 24 and 26. The URLs and host path are two examples of addresses which can be accessed by the present invention. Other addresses might include locations on an Intranet, on a business' network, etc.

Key 10 in one embodiment of the invention is a USB drive with a USB connector that physically connects to the USB port of the computer. Alternately, the key could be any number of other devices which directly connect to a port, such as a parallel port, serial port, WiFi (IEEE 802.11) or a Bluetooth™-enabled device which wirelessly connects to a Bluetooth port or hub attached to a computer. The Bluetooth™ port or hub itself can be a USB connection to the computer or other connection to the computer. The key could be embedded in a mobile phone, for example, which includes a Bluetooth™ connection to a computer. Alternately, the key could be in other devices, such as a PDA, etc., which includes a wireless or wired connection to a port of a computer.

Host 12 could be something other than a computer, such as any intelligent processing device. For example, it could be a game console, a set-top box, etc.

Figure 2:
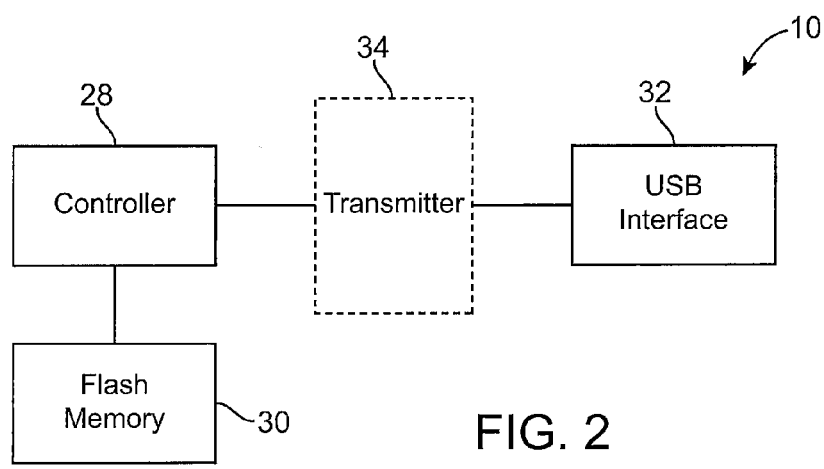
FIG. 2 is a block diagram of the electronic components of a key according to the present invention.

FIG. 2 is a diagram of one embodiment of the electronic circuitry in a key 10 of FIG. 1. The key includes a microcontroller 28 connected to a flash memory 30. The controller is also connected to a USB or other interface 32. Alternately, in a wireless key, a transmitter 34 could be used. Flash memory 30 stores not only the encrypted keys and access data, but also the program for communicating with the host, the program for wireless connection, if applicable, and a program which can be uploaded to the host for recording login information and automatically doing a login. An encryption program is also included, which can be uploaded to the host for execution in encrypting and decrypting passwords and access data.

Figure 3:
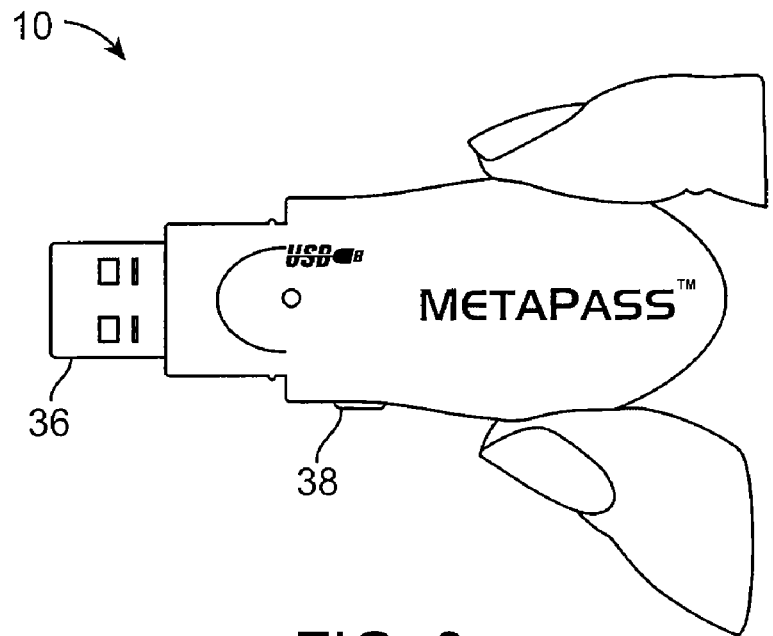
FIG. 3 is a diagram of the housing for the key of the present invention showing the USB port connector exposed.

FIG. 3 is a diagram of one embodiment of a key 10 in the USB drive embodiment. It includes a USB connector 36 and a housing 38 which includes the electronics shown in FIG. 2.

Figure 4:
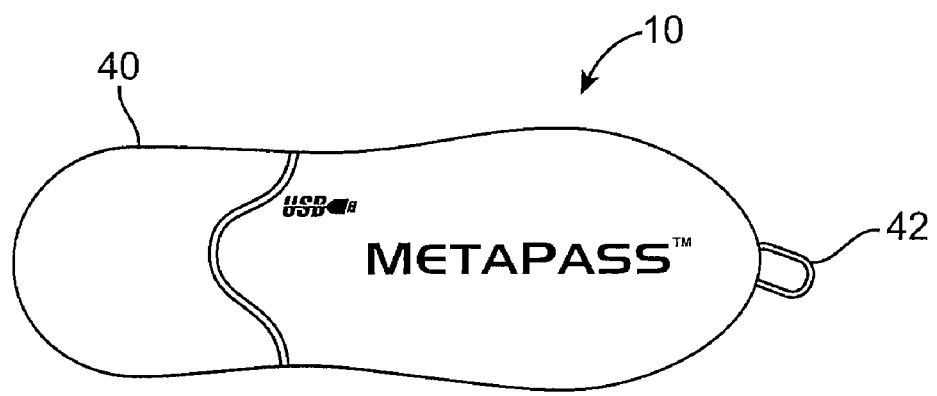
FIG. 4 is a diagram of the key of FIG. 3 showing a cap covering the USB port.

FIG. 4 illustrates the key of FIG. 3 including a removable cover or cap 40 for covering up the USB connector 36 of FIG. 3. In addition, a ring 42 is shown attached to the housing to allow key 10 to be attached to a keyring.

Figure 5:
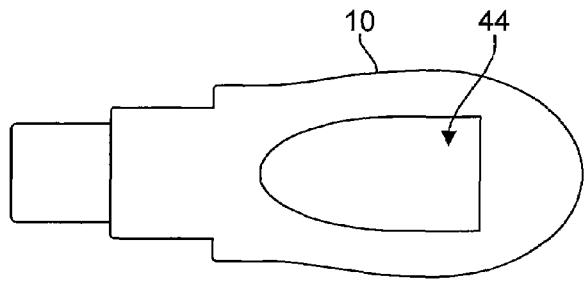
FIG. 5 is a diagram of a key according to the present invention incorporating a fingerprint reader.

FIG. 5 illustrates a key 10 as in FIG. 3, also including a fingerprint reader. A fingerprint reader 44 accommodates a user's finger, and digitizes the user's finger image for further image recognition processing. The details of implementation of such a fingerprint reader are well-known to those of skill in the art and will not be further described herein.

In one embodiment, when the key is plugged into a USB port, or otherwise connects to a port on the computer, it is recognized by the computer just as the computer would recognize any other peripheral attached to one of its ports. In a preferred embodiment, the USB key is configured to appear as a USB drive to the computer. It could appear on the list of drives in the computer, simply requiring a click on that drive in order to activate the software on the drive. Alternately, the key could include an autorun application to boot up the initial screen upon plugging in the key, similarly to the manner in which a CD ROM plugged into a CD drive will initiate an autorun to bring up the CD ROM program.

Figure 6:
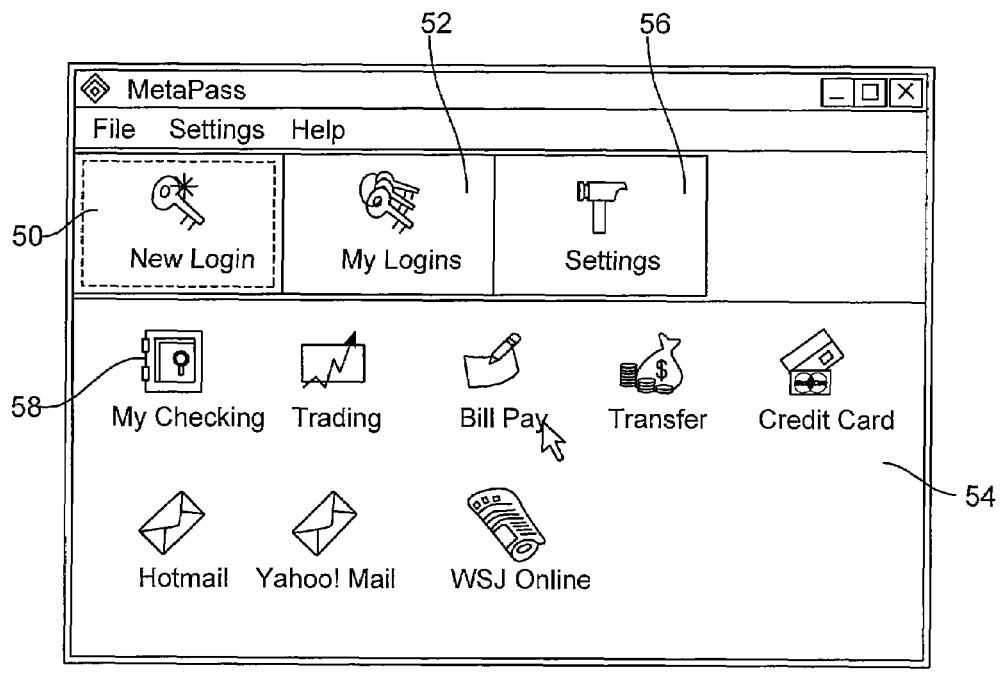
FIG. 6 is a diagram of the main display generated by the program of an embodiment of the present invention.

FIG. 6 illustrates one embodiment of a preferred main display that will appear when the key is plugged in. The display is designed to be simple and intuitive. A "New Login" button 50 is used to initiate the storing of new login information for a new site or address. The "My Logins" button 52 brings up the window 54 illustrated, with icons for currently stored logins. A "Settings" button 56 allows the modification of different settings for the program.

Figure 7:
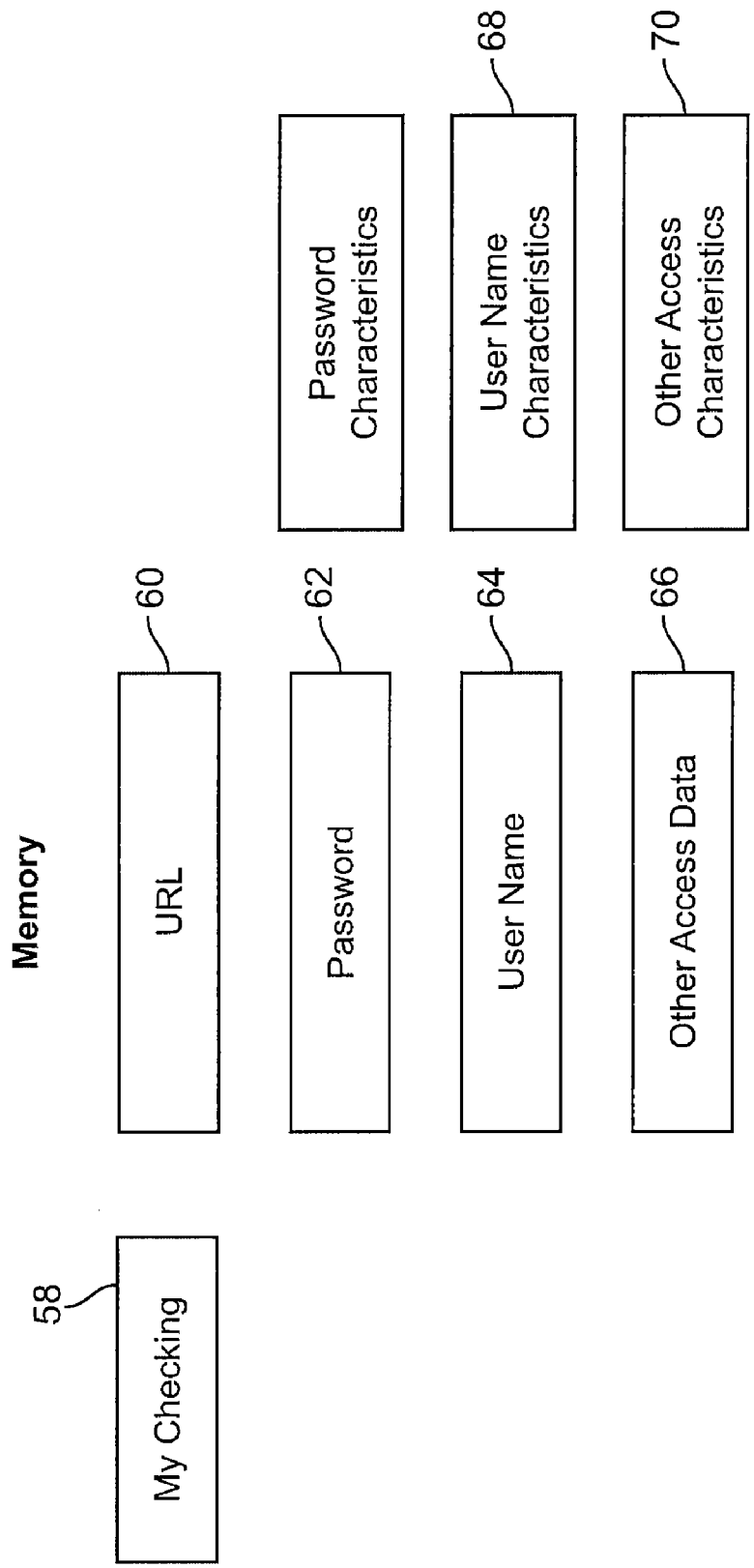
FIG. 7 is a diagram of a portion of the memory contents of a key according to the present invention.

FIG. 7 is an illustration of the data contents in memory 30 of key 10 for an example icon 58 of FIG. 6, "My Checking". As shown, the icon 58 is stored in memory with an associated URL 60 or other address. Also associated is a password 62, a user name 64, and optional other access data 66 as required. In connection with user name 64 are stored characteristics 68 of the entry area for the user name in the login screen. Similarly, the characteristics 70 for other access data 66 are stored.

Figure 8:
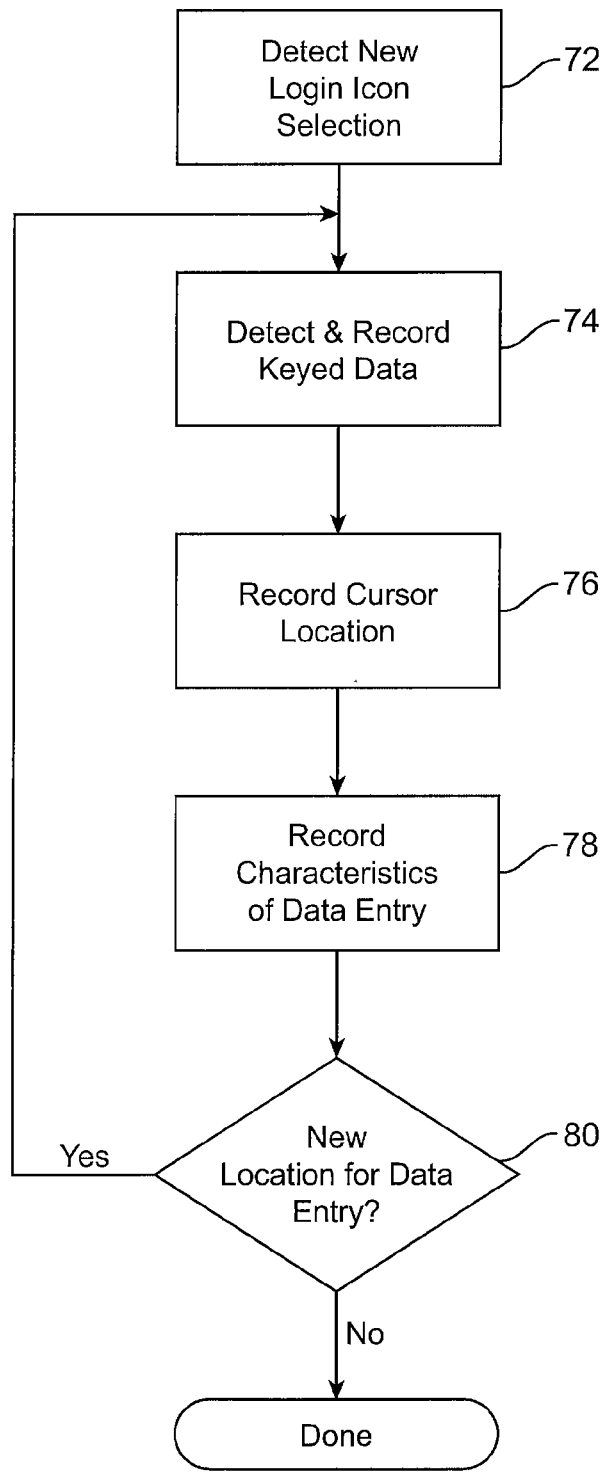
FIG. 8 is a flow chart illustrating the self-learning process for a new login.

FIG. 8 is a flow chart illustrating the acquisition of the data shown in FIG. 7. When a user clicks the new login icon 50 of FIG. 6, this is detected in a step 72 in FIG. 8. This can occur before or after the user goes to a desired address to initiate a new login. The program will then detect and record data which the user keys in to the login page (step 74), as well as detecting the pages the user needs to go to or through to get to the login page. When the user begins keying in the data, the program records the cursor location on a display (step 76). The program also records characteristics of the data entry (step 78). For example, the program could record that the data is being entered into a box for data entry, that the word "password" is immediately above the box, and that the box is located in the top center of the page. Characteristics of the graphics around the box can also be noted and stored. These characteristics can be determined by a screen shot followed by an artificial intelligence system recognizing each element of the page, such as fields, buttons, checkboxes and text.

After initial data entry, if the cursor is moved to a new location for entry of additional data, that is noted (step 80). The process then repeats itself, with the new data being recorded along with its location and characteristics. Upon completion of the login, the program will have developed a table of access data with associated location and characteristics. Typically, this will include at least a password and a user ID. Alternately, other or different access data may be required as well, such as a list box selection or a check box.

The access data, and optionally other data as well, is encrypted (using the user's Master Password as the encryption key) before it is stored in the memory of the key. Decryption requires the entry of a user's master password. Alternately, or in addition, the user may enter biometric information, such as a fingerprint, retinal scan, etc. This can complement the Master Password to give an additional factor, resulting in increased security.

Figure 9:
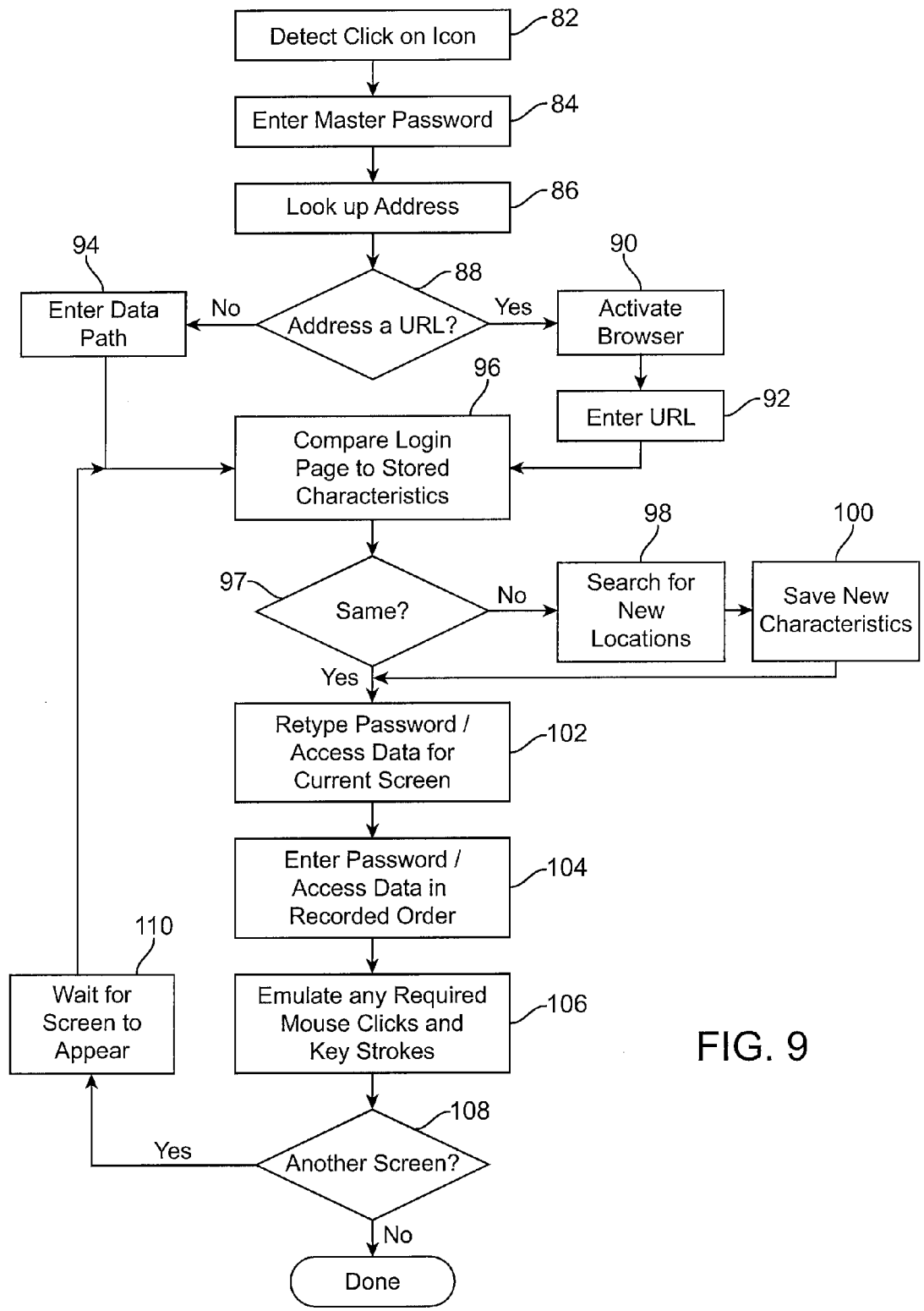
FIG. 9 is a flow chart illustrating the automatic login according to an embodiment of the present invention.

FIG. 9 is a flow chart illustrating a subsequent access and login. The initial click on a particular login icon is first detected (step 82). The user is prompted to enter a master password, and it is verified (step 84). Alternately, the master password could be entered first, such as when the user first connects the key. The address corresponding to the icon is then looked up, and decrypted if necessary (step 86). If the address is a URL (step 88), a browser is activated (step 90) and the decrypted URL is supplied to the browser (step 92).

Preferably, this is done not by emulating the mouse movements and clicks, and entry of keyboard characters, but rather by a DOS-like command line with the browser name followed by the URL as a first parameter. In a preferred embodiment, the program detects the type of browser being used, and can work with any type of browser on any computer or other host device. By using the command line function of entering the browser name and the URL, this can be done independent of the format of a particular browser.

Alternately, the address may be a data path, in which case the data path name is entered in the appropriate format (step 94). This data path may be a path on a host computer to a particular drive and folder, or may be a path through a local area network, etc.

The program then waits until the login page is recognized (step 96). If a page comes up which is not the stored login page, it is examined to determine if it requires the same information as the stored characteristics of the login page to which the program was initialized. This would indicate that the login page format has been changed, in which case the program would initiate a search for new locations on the page for the entry of the login data (step 98). Once the new locations are discovered, the new characteristics would be stored (step 100). If the login page has not changed (step 97), or after storing the new characteristics in the new locations, the password and access data for the current page/screen are decrypted and retrieved (step 102). The appropriate password and/or access data is then entered in the locations where it is required on the screen, following any needed recorded order (step 104). Any required mouse movements and clicks are emulated (step 106). A check is done to see if the login is complete, or another screen requires information to complete the login (step 108). If another screen is required, the system waits for the screen to appear (step 110) and then repeats the process starting with step 96. The order of the above process and the particular steps could be varied, for example by decrypting all the data before any of the screens appear. In one embodiment, the invention provides for automatically entering the password and access data in the entry areas. The program searches for a new entry area with the stored characteristics upon detection that the display presentation has been modified to modify said entry area.

For some sites or programs, multiple login screens may be present. The program according to the present invention will wait until it recognizes each screen (steps 108, 110), or recognizes a modified version of a stored screen. It will then enter the appropriate data, and wait for the next screen to appear, if needed.

The system of one embodiment of the present invention allows automatic login to virtually anything (website, application, etc.) precisely because it has a "visual" approach involving artificial intelligence. In particular:

(1) To store user's credentials, the system records the user's clicks, keystrokes, and images (of buttons, of fields, etc.)

(2) To login, the system plays back the user's sequence of actions, but for each action, it uses artificial intelligence to visually recognize the objects recorded previously, waits for it to appear, and then executes the required action. Such an action can be, for example, a click, a keystroke, or a combination of click+mouse movement.

It is important to note that simply playing back the "movie" of recorded screen images without pausing at recognized objects doesn't work most of the time, because timing may be different (different connection speed, different computer speed), and the system would "click in the air" on some buttons that haven't appeared yet as the page is still loading.

Using artificial intelligence in order to truly recognize objects allows the system to be portable, enabling users to use it from one computer to another. When they do so, the screen location of buttons and fields and other graphical objects are likely to be at different locations than the ones when the login sequence was created, because of different screen resolutions, different color themes, etc. Also, a user may use a mouse with one computer, but use a trackball, touchpad, micro-stick or other pointing device with another computer system. The system of the present invention will recognize the cursor movement and clicking corresponding to any pointing device, and apply it to a different computer system regardless of any changes in the pointing device. The system will also recognize the equivalence between keystrokes and pointing device movements, such as tabbing to a next box on a screen instead of moving a cursor with a mouse.

The AI system will recognize and click, for instance, on a button called "Login", even though at the creation the button was called "Signin". This way, even when website designers change their sites, the AI adapts and tries and clicks on the correct buttons and types in the right fields. The process of the invention applies not only to websites, but also to a series of screens for an application as well, using the same principles.

In a preferred embodiment, once the user is done and removes the key, the portion of the program uploaded to the computer recognizes the disconnection of the key and automatically both closes itself, and deletes itself from the computer. The encrypted data itself is preferably never stored on the computer, but rather in the key, thus there is no need to erase this data. This provides a high level of security and also allows for complete portability from one computer to another.

In the USB drive embodiment where a physical connector is used, the device obtains its power off a USB bus, similar to other USB drives currently produced. Upon first connection to a computer, the program on the key will first determine if the computer includes the JAVA virtual machine software so that it can run the program from the key. If not, JAVA is installed on the computer either by uploading it from the key, or by causing the computer to download the JAVA software over an Internet connection.

In the embodiment of a wireless key, the disconnection of the device can either be by the user closing the window, pushing a disconnect or power off key on the key device, or by the user simply walking out of range of the host, which will initiate shutdown upon loss of the connection.

In one embodiment, a biometric device such as a fingerprint reader could be on a different peripheral from the key itself. For example, the key could work in conjunction with a fingerprint reader installed on a keyboard.

In one embodiment, a flash memory on the key includes the password file, JAVA or another program, and code for the microcontroller in the key itself. Preferably, the microcontroller on the key manages the communication with the host, such as through the USB protocol. Additionally, it will handle communication with the flash memory. The rest of the software can be uploaded to the host, for example the encryption and decryption programs and the programs for recording the login process and duplicating it later on. In one embodiment, the encryption can be done inside the key to provide additional security. Encryption software using Blowfish or AES, or any other encryption program could be used.

In one embodiment, in addition to logging on to websites or applications, the key can include the password for unlocking or logging onto the host itself. This could be accomplished by first turning on the power for the computer and then plugging the key into the USB port, and then it would automatically recognize the initial login screen when it appears and fill in the login data to start the computer.

As will be understood by those with skill in the art, the present invention may be embodied in other specific forms without departing from the essential characteristics thereof. For example, the key could be embedded in a cell phone, PDA, or other wireless device and could wirelessly connect to the host. The application software could be run from the key itself, rather than uploading to the host, or a determination could be made of the connection speed to determine which place to run the program from. Instead of a USB port, a parallel port, serial port, or other port or wireless connection to a host could be used. Accordingly, the foregoing description is intended to be illustrative, but not limiting, of the scope of the invention which is set forth in the following claims.

What is claimed is:

1. A peripheral device for connecting to a host, comprising:
an interface to a port of said host;
a processor;
a memory storing a plurality of passwords and associated access data;
said memory including a program in computer readable code for causing said processor to communicate with said host through said port, for causing said processor to access said passwords and associated data and for automatically logging in to password protected systems;
wherein said program in said memory further comprises computer readable code for:
storing an image of a login screen;
recording characteristics of said login screen, including characteristics of entry areas for a password and access data, said characteristics including features and locations of visually recognizable objects;
monitoring the entry of a password and access data by a user interacting with said login screen;
recording said password, access data, characteristics, features and locations of visually recognizable objects and locations of said entry areas on said login screen in connection with an address of an application which generates said login screen;
subsequently accessing said application and said login screen using said address;
visually recognizing current objects on said login screen in said entry area;
comparing said current objects with said recorded features and locations of visually recognizable objects;
determining that one of said entry areas has moved;
searching for a new entry area with said characteristics upon detection that said display presentation has been modified to modify said entry area;
automatically entering said password and access data in said new entry area; and
storing features and locations of visually recognizable objects and a location of said new entry area.

2. The peripheral device of claim 1 wherein said port is a USB port.

3. The peripheral device of claim 1 wherein said port is a wireless port.

4. The peripheral device of claim 1 wherein said memory contains a program for inserting a selected one of said passwords and related access data into a login page.

5. The peripheral device of claim 1 wherein said memory further comprises:
a program for initiating communication with said host over said port, and identifying said peripheral device to said host.

6. The peripheral device of claim 1 wherein said peripheral device is a phone.

7. The peripheral device of claim 1 wherein said program requires a user input PIN to access said passwords.

8. The peripheral device of claim 1 wherein said program requires a user input biometric to access said passwords.

9. The peripheral device of claim 8 wherein said biometric is a fingerprint.

10. The peripheral device of claim 9 further comprising:
a fingerprint reader.

11. The peripheral device of claim 1 wherein said address is a URL.

12. The peripheral device of claim 1 wherein said address is a path on said host.

13. A method for automatically accessing an application comprising:
storing an image of a login screen;
recording characteristics of said login screen, including characteristics of entry areas for a password and access data, said characteristics including features and locations of visually recognizable objects;
monitoring the entry of a password and access data by a user interacting with said login screen;
recording said password, access data, characteristics, features and locations of visually recognizable objects and locations of said entry areas on said login screen in connection with an address of an application which generates said login screen;
subsequently accessing said application and said login screen using said address;
visually recognizing current objects on said login screen in said entry area;
comparing said current objects with said recorded features and locations of visually recognizable objects;
determining that one of said entry areas has moved;
searching for a new entry area with said characteristics upon detection that said display presentation has been modified to modify said entry area;
automatically entering said password and access data in said new entry area; and
storing features and locations of visually recognizable objects and a location of said new entry area.

14. The method of claim 13 wherein said address is a URL.

15. The method of claim 13 wherein said address is a path on said host.

16. The method of claim 13 wherein said monitoring comprises recording said user's actions.

17. The method of claim 16 wherein said users actions comprise pointing device movements, clicks and keystrokes.

18. The method of claim 16 wherein said subsequently accessing and automatically entering comprises:
waiting for a display presentation to appear;
visually recognizing said characteristics; and
playing back said user's actions.

19. The method of claim 18 wherein said user's actions comprise sequence of pointing device movements, clicks and keystrokes.

20. A computer readable medium comprising:
a plurality of passwords and associated access data;
a plurality of computer readable instructions encoded thereon, said instructions including:
instructions for initiating a direct connection to a host from a peripheral device;
instructions for causing said host to access said passwords and associated data and for automatically logging in to password protected systems; and a program uploadable to said host for initiating access over the Internet to said password protected systems;

wherein said program further comprises computer readable code for:

storing an image of a login screen;

recording characteristics of said login screen, including characteristics of entry areas for a password and access data, said characteristics including features and locations of visually recognizable objects;

monitoring the entry of a password and access data by a user interacting with said login screen;

recording said password, access data, characteristics, features and locations of visually recognizable objects and locations of said entry areas on said login screen in connection with an address of an application which generates said login screen;

subsequently accessing said application and said login screen using said address;

visually recognizing current objects on said login screen in said entry area;

comparing said current objects with said recorded features and locations of visually recognizable objects;

determining that one of said entry areas has moved;

searching for a new entry area with said characteristics upon detection that said display presentation has been modified to modify said entry area;

automatically entering said password and access data in said new entry area; and storing features and locations of visually recognizable objects and a location of said new entry area.

21. A computer readable medium comprising:

a plurality of computer readable instructions encoded thereon, said instructions including:

instructions for storing a plurality of passwords and associated access data;

instructions for automatically logging in to password protected systems;

instructions for storing an image of a login screen;

instructions for recording characteristics of said login screen, including characteristics of entry areas for a password and access data, said characteristics including features and locations of visually recognizable objects;

instructions for monitoring the entry of a password and access data by a user interacting with said login screen;

instructions for recording said password, access data, characteristics, features and locations of visually recognizable objects and locations of said entry areas on said login screen in connection with an address of an application which generates said login screen;

instructions for subsequently accessing said application and said login screen using said address;

instructions for visually recognizing current objects on said login screen in said entry area;

instructions for comparing said current objects with said recorded features and locations of visually recognizable objects;

instructions for determining that one of said entry areas has moved;

instructions for searching for a new entry area with said characteristics upon detection that said display presentation has been modified to modify said entry area;

instructions for automatically entering said password and access data in said new entry area; and instructions for storing features and locations of visually recognizable objects and a location of said new entry area.

22. A method comprising:

storing a plurality of passwords and associated access data;

automatically logging in to password protected systems;

storing a visual representation of at least one login page, including a representation of the location of the position on said login page for said password and associated access data;

detecting a modification of said login page;

locating, responsive to said detecting, new positions on said login page for said password and associated access data;

storing a visual representation of said new positions;

entering said password and associated data in said new positions;

storing an image of a login screen;

recording characteristics of said login screen, including characteristics of entry areas for a password and access data, said characteristics including features and locations of visually recognizable objects;

monitoring the entry of a password and access data by a user interacting with said login screen;

recording said password, access data, characteristics, features and locations of visually recognizable objects and locations of said entry areas on said login screen in connection with an address of an application which generates said login screen;

subsequently accessing said application and said login screen using said address;

visually recognizing current objects on said login screen in said entry area;

comparing said current objects with said recorded features and locations of visually recognizable objects;

determining that one of said entry areas has moved;

searching for a new entry area with said characteristics upon detection that said display presentation has been modified to modify said entry area;

automatically entering said password and access data in said new entry area; and storing features and locations of visually recognizable objects and a location of said new entry area.

23. The method of claim 22 further comprising:

monitoring an initial entry of said password and associated data by a user by detecting the clicks and data input of said user;

detecting pages and locations on said pages where said password and associated data are initially entered by said user;

detecting characteristics of said locations and adjacent objects, including at least one of fields, buttons, checkboxes and text; and storing said detected characteristics of said locations.

* * * * *